US012795691B2

(12) United States Patent
Matsumura et al.

(10) Patent No.: US 12,795,691 B2
(45) Date of Patent: Nov. 10, 2026

(54) TERMINAL, METHOD, BASE STATION, AND SYSTEM FOR CONFIGURING SRS RESOURCE SETS

(71) Applicant: NTT DOCOMO, INC., Tokyo (JP)

(72) Inventors: Yuki Matsumura, Tokyo (JP); Naoya Shibaike, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 275 days.

(21) Appl. No.: 18/699,464

(22) PCT Filed: Oct. 7, 2022

(86) PCT No.: PCT/JP2022/037537
§ 371 (c)(1),
(2) Date: Apr. 8, 2024

(87) PCT Pub. No.: WO2023/063233
PCT Pub. Date: Apr. 20, 2023

(65) Prior Publication Data
US 2024/0406975 A1 Dec. 5, 2024

(30) Foreign Application Priority Data
Oct. 13, 2021 (JP) ................................ 2021-168400

(51) Int. Cl.
*H04W 72/232* (2023.01)
*H04L 5/00* (2006.01)
*H04W 72/044* (2023.01)

(52) U.S. Cl.
CPC ......... *H04W 72/232* (2023.01); *H04L 5/0051* (2013.01); *H04W 72/044* (2013.01)

(58) Field of Classification Search
CPC ......................... H04W 72/232; H04W 72/044; H04L 5/0051; H04L 5/00; H04L 5/0048; H04L 5/0094
See application file for complete search history.

(56) References Cited

U.S. PATENT DOCUMENTS

2019/0174466 A1* 6/2019 Zhang ..................... H04L 5/005
2022/0029861 A1* 1/2022 Shahmohammadian .................... H04L 5/0048

(Continued)

FOREIGN PATENT DOCUMENTS

WO WO-2022080442 A1 * 4/2022 ........... H04L 5/0051

OTHER PUBLICATIONS

Provisional Specification for U.S. Appl. No. 63/092,416, Oct. 15, 2020; Sharp; Yokomakura et al. (Year: 2021).*

(Continued)

*Primary Examiner* — Afshawn M Towfighi
(74) *Attorney, Agent, or Firm* — Osha Bergman Watanabe & Burton LLP

(57) ABSTRACT

A terminal according to one aspect of the present disclosure includes: a receiving section that receives configuration for a plurality of sounding reference signal (SRS) resource sets and receives downlink control information indicating triggering of an SRS; and a control section that controls transmission of the SRS by using one or more SRS resource sets indicated in the downlink control information out of the plurality of SRS resource sets, wherein a timing for the transmission of the SRS is based on a timing for reception of the downlink control information and on a first offset and a second offset included in the one or more SRS resource sets. According to one aspect of the present disclosure, it is possible to flexibly control SRS triggering.

5 Claims, 22 Drawing Sheets

```
SRS-ResourceSet ::=              SEQUENCE {
  srs-ResourceSetId                SRS-ResourceSetId,
  srs-ResourceIdList               SEQUENCE (SIZE(1..maxNrofSRS-ResourcesPerSet)) OF SRS-ResourceId   OPTIONAL, -- Cond Setup
  resourceType                     CHOICE {
    aperiodic                      SEQUENCE {
      aperiodicSRS-ResourceTrigger       INTEGER (1..maxNrofSRS-TriggerStates-1),
      csi-RS                       NZP-CSI-RS-ResourceId              OPTIONAL, -- Cond NonCodebook
      slotOffset                     INTEGER (1..32)                  OPTIONAL, -- Need S
      ...,
      [[
      aperiodicSRS-ResourceTriggerList        SEQUENCE (SIZE(1..maxNrofSRS-TriggerStates-2))
                                       OF INTEGER (1..maxNrofSRS-TriggerStates-1)  OPTIONAL -- Need M
      ]]
    },
    ...
  },
  ...
}
```

(56) References Cited

U.S. PATENT DOCUMENTS

| | | | | |
|---|---|---|---|---|
| 2022/0376858 | A1* | 11/2022 | Afana | H04L 5/001 |
| 2023/0171783 | A1* | 6/2023 | Khoshnevisan | H04L 5/0048 370/329 |
| 2023/0388076 | A1* | 11/2023 | Yokomakura | H04L 5/0048 |

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

International Search Report issued in corresponding International Application No. PCT/JP2022/037537, mailed on Jan. 10, 2023 (3 pages).

Written Opinion issued in corresponding International Application No. PCT/JP2022/037537, mailed on Jan. 10, 2023 (3 pages).

NTT Docomo, Inc.; "Discussion on SRS enhancement"; 3GPP TSG RAN WG1 #106b-e, R1-2107843; e-Meeting; Aug. 16-27, 2021 (15 pages).

Office Action issued in Japanese Patent Application No. 2023-554479, issued Jun. 24, 2025 (6 pages).

3GPP TSG RAN WG1 #106bis-e; R1-2109043; OPPO; "Enhancements on SRS flexibility, coverage and capacity"; e-Meeting, Oct. 11-19, 2021 (14 pages).

* cited by examiner

```
SRS-ResourceSet ::=                SEQUENCE {
  srs-ResourceSetId                  SRS-ResourceSetId,
  srs-ResourceIdList                 SEQUENCE (SIZE(1..maxNrofSRS-ResourcesPerSet)) OF SRS-ResourceId    OPTIONAL, -- Cond Setup
  resourceType                      CHOICE {
    aperiodic                        SEQUENCE {
      aperiodicSRS-ResourceTrigger          INTEGER (1..maxNrofSRS-TriggerStates-1),
      csi-RS                         NZP-CSI-RS-ResourceId                         OPTIONAL, -- Cond NonCodebook
      slotOffset                       INTEGER (1..32)                             OPTIONAL, -- Need S
      ...,
      [[
      aperiodicSRS-ResourceTriggerList          SEQUENCE (SIZE(1..maxNrofSRS-TriggerStates-2))
                                         OF INTEGER (1..maxNrofSRS-TriggerStates-1)  OPTIONAL  -- Need M
      ]]
    },
    ...
  },
  ...
}
```

FIG. 1

| Value of SRS request field | Triggered SRS resource set(s) |
|---|---|
| 00 | No aperiodic SRS resource sets triggered |
| 01 | 1st SRS resource set(s) |
| 10 | 2nd SRS resource set(s) |
| 11 | 3rd SRS resource set(s) |

FIG. 2

| DCI codepoint of t indicator field | t value |
|---|---|
| 00 | $t_0$ |
| 01 | $t_1$ |
| 10 | $t_2$ |
| 11 | $t_3$ |

FIG. 5

| Value of SRS request field | Triggered aperiodic SRS resource set(s) for DCI format 0_1, 0_2, 1_1, 1_2, and 2_3 configured with higher layer parameter *srs-TPC-PDCCH-Group* set to 'typeB' | Triggered aperiodic SRS resource set(s) for DCI format 2_3 configured with higher layer parameter *srs-TPC-PDCCH-Group* set to 'typeA' |
|---|---|---|
| 00 | No aperiodic SRS resource set triggered | No aperiodic SRS resource set triggered |
| 01 | SRS resource set(s) configured by *SRS-ResourceSet* with higher layer parameter *aperiodicSRS-ResourceTrigger* set to 1 or an entry in *aperiodicSRS-ResourceTriggerList* set to 1<br><br>SRS resource set(s) configured by *SRS-PosResourceSet* with an entry in *aperiodicSRS-ResourceTriggerList* set to 1 when triggered by DCI formats 0_1, 0_2, 1_1, and 1_2 | SRS resource set(s) configured with higher layer parameter *usage* in *SRS-ResourceSet* set to '*antennaSwitching*' and *resourceType* in *SRS-ResourceSet* set to 'aperiodic' for a 1st set of serving cells configured by higher layers |
| 10 | SRS resource set(s) configured by *SRS-ResourceSet* with higher layer parameter *aperiodicSRS-ResourceTrigger* set to 2 or an entry in *aperiodicSRS-ResourceTriggerList* set to 2<br><br>SRS resource set(s) configured by *SRS-PosResourceSet* with an entry in *aperiodicSRS-ResourceTriggerList* set to 2 when triggered by DCI formats 0_1, 0_2, 1_1, and 1_2 | SRS resource set(s) configured with higher layer parameter *usage* in *SRS-ResourceSet* set to '*antennaSwitching*' and *resourceType* in *SRS-ResourceSet* set to 'aperiodic' for a 2nd set of serving cells configured by higher layers |
| 11 | SRS resource set(s) configured by *SRS-ResourceSet* with higher layer parameter *aperiodicSRS-ResourceTrigger* set to 3 or an entry in *aperiodicSRS-ResourceTriggerList* set to 3<br><br>SRS resource set(s) configured by *SRS-PosResourceSet* with an entry in *aperiodicSRS-ResourceTriggerList* set to 3 when triggered by DCI formats 0_1, 0_2, 1_1, and 1_2 | SRS resource set(s) configured with higher layer parameter *usage* in *SRS-ResourceSet* set to '*antennaSwitching*' and *resourceType* in *SRS-ResourceSet* set to 'aperiodic' for a 3rd set of serving cells configured by higher layers |

FIG. 6

| Value of SRS request field | Triggered aperiodic SRS resource set(s) for DCI format 0_2 and 1_2 |
|---|---|
| 0 | No aperiodic SRS resource set triggered |
| 1 | SRS resource set(s) configured with higher layer parameter *aperiodicSRS-ResourceTrigger* set to 1 or an entry in *aperiodicSRS-ResourceTriggerList* set to 1 |

FIG. 7

| DCI codepoint of SRS request field | SRS resource set(s) |
|---|---|
| 00 | No SRS resource set triggered |
| 01 | 1st SRS resource set(s) |
| 10 | 2nd SRS resource set(s) |
| 11 | 3rd SRS resource set(s) |

SRS resource set#1 aperiodicSRS-ResourceTrigger = 1 t value(s) = {t1, t2}

...

SRS resource set#2 aperiodicSRS-ResourceTrigger = 1 t value(s) = {t1, t2}

...

FIG. 8

SRS request field (2-bit)

| DCI codepoint of SRS request field | SRS resource set(s) |
|---|---|
| 00 | No SRS resource set triggered |
| 01 | 1st SRS resource set(s) |
| 10 | 2nd SRS resource set(s) |
| 11 | 3rd SRS resource set(s) |

SRS request field (1-bit)

| DCI codepoint of SRS request field | SRS resource set(s) |
|---|---|
| 0 | No SRS resource set triggered |
| 1 | 1st SRS resource set(s) |

NUMBER OF t VALUES CONFIGURED FOR EACH SRS RESOURCE SET IS SAME

FIG. 10

FIG. 13A

SRS request field (2-bit) for DCI format 1_1/0_1

| DCI codepoint of SRS request field | SRS resource set(s) | |
|---|---|---|
| 00 | No SRS resource set triggered | |
| 01 | 1st SRS resource set(s) | t1, t2 |
| 10 | 2nd SRS resource set(s) | t1, t2 |
| 11 | 3rd SRS resource set(s) | t1, t2, t3, t4 |

FIG. 13B

SRS request field (1-bit) for DCI format 1_2/0_2

| DCI codepoint of SRS request field | SRS resource set(s) | |
|---|---|---|
| 0 | No SRS resource set triggered | |
| 1 | 1st SRS resource set(s) | t1, t2 |

t indicator field (2-bit)

| DCI codepoint of t indicator field | t value |
|---|---|
| 00 | $t_0$ |
| 01 | $t_1$ |
| 10 | $t_2$ |
| 11 | $t_3$ |

DCI format 1_2/0_2 (codepoints 00–01)

DCI format 1_1/0_1 (codepoints 00–11)

FIG. 15

FIG. 17A t indicator field (2-bit)

| DCI codepoint of t indicator field | t value |
|---|---|
| 00 | $t_0$ |
| 01 | $t_1$ |
| 10 | $t_2$ |
| 11 | $t_3$ |

FIG. 17B t indicator field (1-bit)

| DCI codepoint of t indicator field | t value |
|---|---|
| 0 | $t_0$ |
| 1 | $t_1$ |

TERMINAL, METHOD, BASE STATION, AND SYSTEM FOR CONFIGURING SRS RESOURCE SETS

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+(plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems, a sounding reference signal (SRS) has a wide range of usages. For example, an SRS in NR is used not only for CSI measurement in uplink (UL) but also for CSI measurement in downlink (DL), beam management, and the like.

However, studies have not been progressed on flexibility of SRS triggering. Unless SRS triggering is flexibly performed, resource utilization efficiency, communication throughput, communication quality, and/or the like may be degraded.

In view of this, the present disclosure has one object to provide a terminal, a radio communication method, and a base station that flexibly control SRS triggering.

Solution to Problem

A terminal according to one aspect of the present disclosure includes: a receiving section that receives configuration for a plurality of sounding reference signal (SRS) resource sets and receives downlink control information indicating triggering of an SRS; and a control section that controls transmission of the SRS by using one or more SRS resource sets indicated in the downlink control information out of the plurality of SRS resource sets, wherein a timing for the transmission of the SRS is based on a timing for reception of the downlink control information and on a first offset and a second offset included in the one or more SRS resource sets.

Advantageous Effects of Invention

According to one aspect of the present disclosure, it is possible to flexibly control SRS triggering.

BRIEF DESCRIPTION OF DRAWINGS

FIG. 1 shows an example of configuration for an SRS resource set.

FIG. 2 shows an example of association between values of an SRS request field and SRS resource sets.

FIG. 5 shows an example of association between values of a new field and t values.

FIG. 6 shows an example of association between values of a 2-bit SRS request field and SRS resource sets.

FIG. 7 shows an example of association between values of a 1-bit SRS request field and SRS resource sets.

FIG. 8 shows an example of Restriction 1.

FIG. 10 shows an example of Restriction 3.

FIGS. 13A and 13B each show an example a third embodiment.

FIG. 15 shows an example of association between values of the new field and t values according to Assumption 1.

FIGS. 17A and 17B each show an example of association between values of the new field and t values according to Assumption 1.

DESCRIPTION OF EMBODIMENTS (SRS)

Figure 3A:
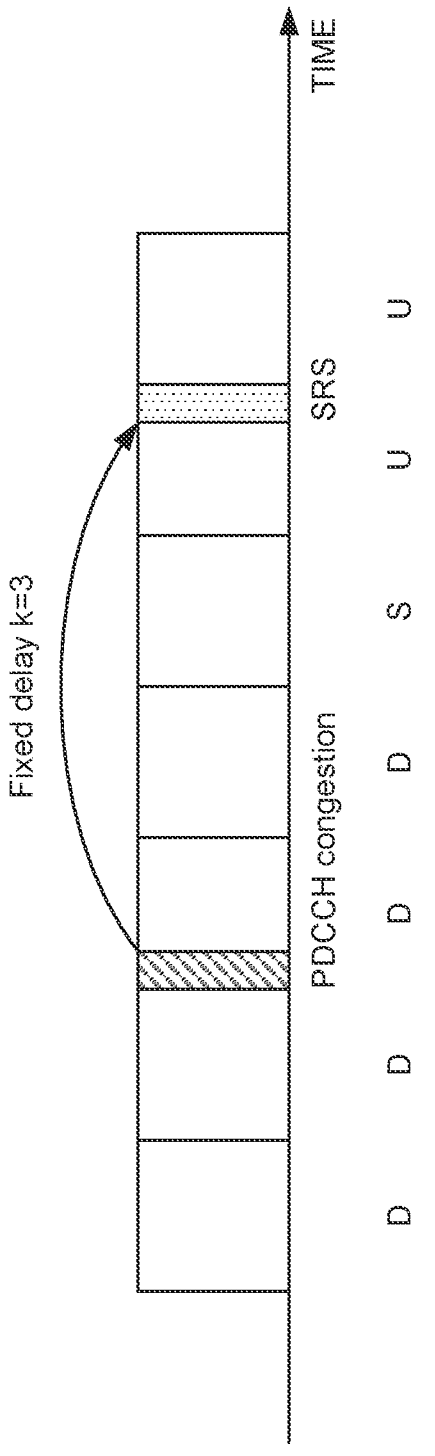
FIGS. 3A and 3B each show an example of a limitation for A-SRS triggering.

In NR, a reference signal for measurement (sounding reference signal (SRS)) has a wide range of usages. An SRS in NR is used not only for CSI measurement in uplink (UL), for which an SRS in existing LTE (LTE Rel. 8 to Rel. 14) is used as well, but also for CSI measurement in downlink (DL), beam management, and the like.

A UE may be configured with one or a plurality of SRS resources. An SRS resource may be specified by an SRS resource index (SRI).

Each SRS resource may have one or a plurality of SRS ports (may correspond to one or the plurality of SRS ports). For example, the number of ports for each SRS may be one, two, four, or the like.

The UE may be configured with one or a plurality of SRS resource sets. One SRS resource set may be associated with a certain number of SRS resources. The UE may use a higher layer parameter commonly to SRS resources included in one SRS resource set. Note that a resource set in the present disclosure may be interpreted as a set, a resource group, a group, and the like.

Information related to an SRS resource or resource set may be configured for the UE by using higher layer signaling, physical layer signaling, or a combination of these.

SRS configuration information (for example, an RRC information element "SRS-Config") may include SRS resource set configuration information, SRS resource configuration information, or the like.

The SRS resource set configuration information (for example, an RRC parameter "SRS-ResourceSet") may include information related to an SRS resource set ID (Identifier) (SRS-ResourceSetId), a list of SRS resource IDs (SRS-ResourceId) used in the resource set, an SRS resource type (resourceType), or an SRS usage.

Here, the SRS resource type may indicate time domain behavior (same time domain behavior) of the SRS resource configuration. The SRS resource type may indicate any one of a periodic SRS (P-SRS), a semi-persistent SRS (SP-SRS), and an aperiodic SRS (A-SRS). Note that the UE may transmit a P-SRS and an SP-SRS periodically (or periodically after activation). The UE may transmit an A-SRS on the basis of an SRS request of DCI.

The SRS usage (an RRC parameter "usage", an L1 (Layer-1) parameter "SRS-SetUse") may be, for example, beam management (beamManagement), codebook (CB), non-codebook (NCB), antenna switching (antennaSwitching), or the like. For example, an SRS of codebook or non-codebook usage may be used for determination of a precoder for codebook-based or non-codebook-based uplink shared channel (Physical Uplink Shared Channel (PUSCH)) transmission based on an SRI.

An SRS of beam management usage may be assumed that only one SRS resource for each SRS resource set is possible to be transmitted in a certain time instant (given time instant). Note that, in the same Bandwidth Part (BWP), when a plurality of SRS resources corresponding to the same time domain behavior each belong to a respective one of different SRS resource sets, these SRS resources may be transmitted at same time.

The SRS resource configuration information (for example, an RRC parameter "SRS-Resource") may include an SRS resource ID (SRS-ResourceId), the number of SRS ports, an SRS port number, a transmission Comb, SRS resource mapping (for example, time and/or frequency resource location, resource offset, resource periodicity, number of times of repetition, number of SRS symbols, SRS bandwidth, or the like), hopping related information, an SRS resource type, a sequence ID, spatial relation information, or the like.

The UE may switch, per slot, a Bandwidth Part (BWP) in which an SRS is to be transmitted, or may switch an antenna. The UE may use at least one of intra-slot hopping and inter-slot hopping for the SRS transmission.

(A-SRS Triggering)

In Rel. 15/16, an A-SRS is triggered by an SRS request field in DCI.

By an RRC IE, each SRS resource set is configured with an SRS triggering state (A-SRS resource trigger, aperiodicSRS-ResourceTrigger={0, 1, 2, 3}) (FIG. 1), and each value (codepoint) of the SRS request field is associated with one or more SRS resource sets (FIG. 2). If a value of the SRS request field is 00, no SRS is triggered. If a value of the SRS request field is not 00, an SRS resource in an SRS resource set corresponding to an SRS triggering state of the value is triggered (transmitted).

The A-SRS resource trigger (aperiodicSRS-ResourceTrigger) is a DCI codepoint. A UE transmits an SRS in accordance with an SRS resource set corresponding to the codepoint. An A-SRS resource trigger list (aperiodicSRS-ResourceTriggerList) is an additional list of DCI codepoints.

An existing SRS request is performed using DCI format 0_1 or 1_1, and involves at least one of data scheduling and CSI triggering. If DCI is allowed to be used only for an SRS request, a DCI field of at least one of data scheduling and CSI triggering is possible to be reused. For example, a size of an SRS request is increased to be used for indication of time/frequency/orthogonal cover code (OCC)/cyclic shift resources for SRS, allowing the flexibility of SRS triggering to be enhanced.

Enhancement of at least one DCI format for A-SRS triggering is under study. The DCI format may be a UE-specific DCI format. The DCI format may be a new DCI format without at least one of data scheduling and CSI triggering. The new DCI format may have the same size as a DCI format (for example, existing DCI format, DCI format 0_1) for A-SRS triggering with at least one of data scheduling and CSI triggering. The new DCI format may be a DCI format that does not use a part of fields in an existing DCI format (a DCI format that has an invalid value or special value set in a part of fields in the existing DCI format).

The UE may judge (distinguish) whether a DCI format including an SRS request includes at least one of data scheduling and CSI triggering, on the basis of at least one of a radio network temporary identifier (RNTI) to scramble a cyclic redundancy check (CRC) of DCI, a special value of one or more special fields in the DCI, and addition of a new DCI field (for example, DCI format indicator) when configured by an RRC IE.

A duration between A-SRS triggering and SRS transmission corresponds to time k that is RRC-configured for each SRS resource set, in other words, a slotoffset parameter. The number of SRS sets configured for DL CSI acquisition is limited (up to two).

Figure 3B:
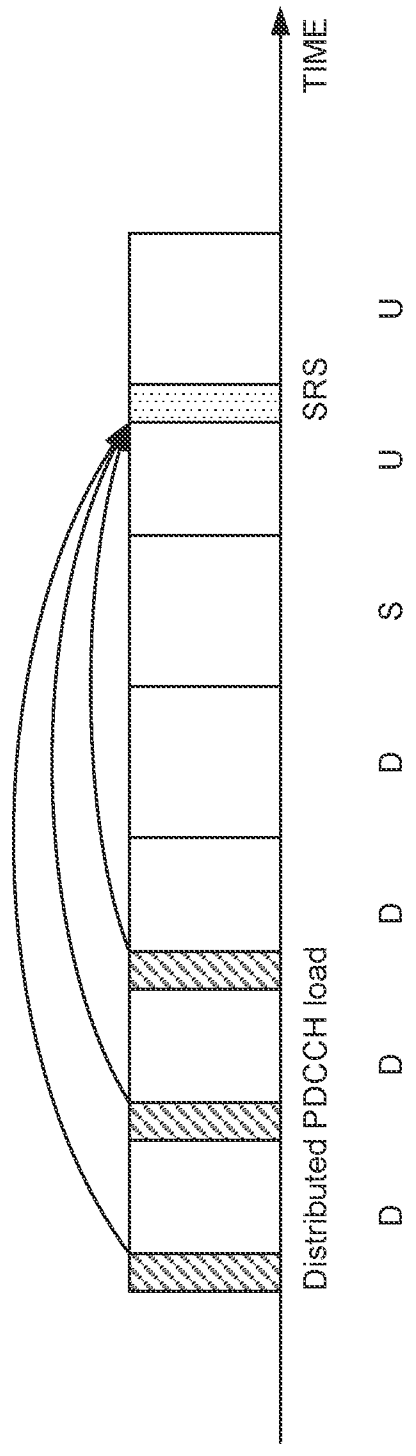

This means that an SRS is to be triggered in a specific slot because a distance to a UL slot is fixed in semi-static TDD configuration (FIG. 3A). LTE does not have such a strict timing limitation (FIG. 3B).

For example, there is a case where an A-SRS cannot be triggered when necessary, due to PDCCH congestion, lack of UL or DL grant, or the like. This causes a bottleneck in reciprocity-based MU-MIMO operation PDCCH capacity useful for SRS triggering for a plurality of candidate users scheduled together for simultaneous transmission of SRSs.

Even when triggering grants (PDCCHs) for many UEs are transmitted in a plurality of DL slots to distribute the PDCCH load, it is desirable to improve flexibility of A-SRS triggering in order to allow the UEs to transmit SRSs in the same UL slot.

(Enhancement on A-SRS Triggering)

Enhancement on A-SRS triggering is under study. An A-SRS resource set may be transmitted in an available slot that is the (t+1)-th one counted from a reference slot. t may be indicated by DCI, or may be indicated by RRC (only one value for t may be configured in the RRC) (A-SRS triggering enhancement function). A candidate value for t may include at least 0. The reference slot may be a slot indicated by a legacy triggering offset (for example, slotoffset).

Figure 4:
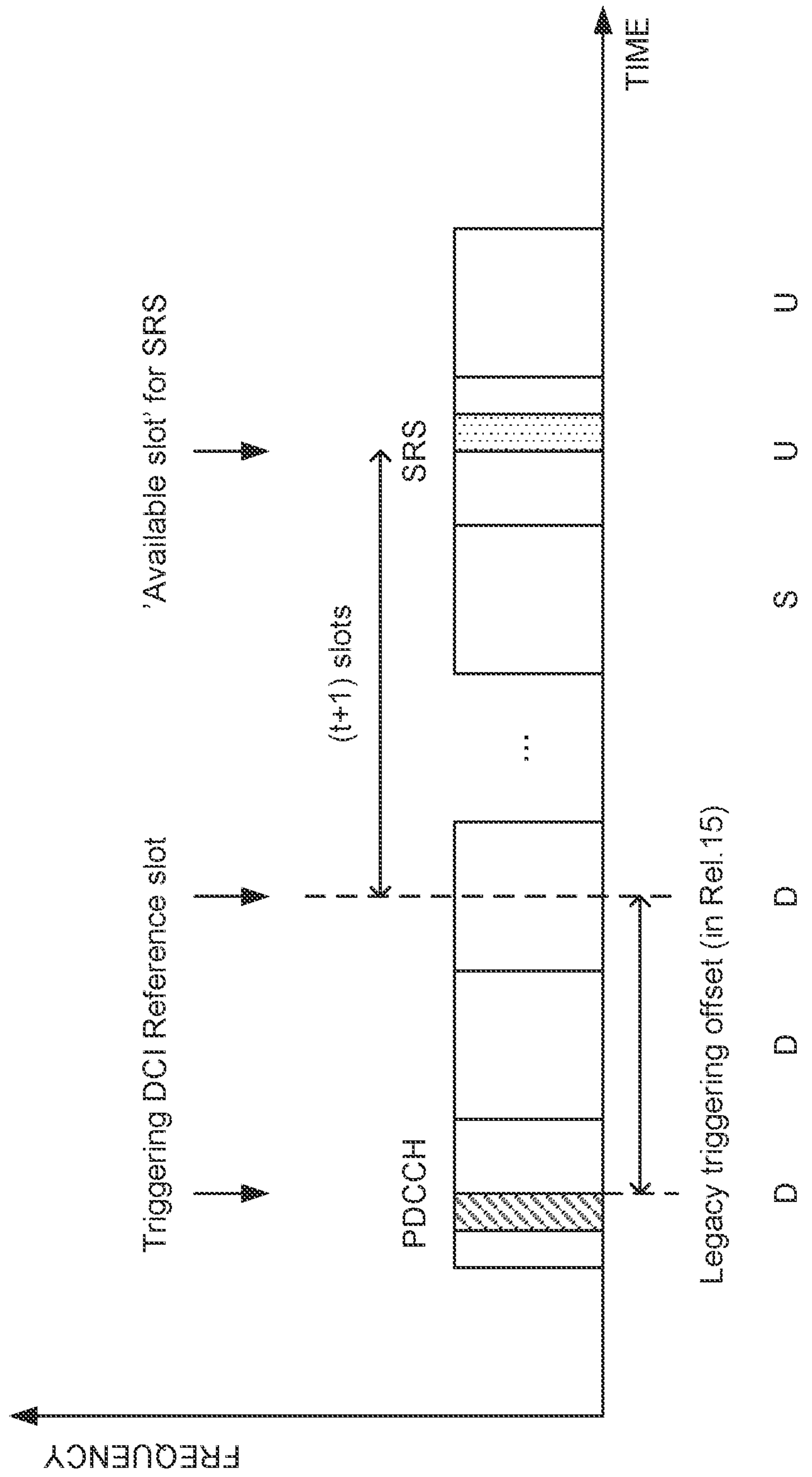
FIG. 4 shows an example of an A-SRS triggering enhancement function.

In an example of FIG. 4, a UE transmits an SRS in a next available UL slot after t slots indicated by a legacy triggering offset configured by an SRS resource set. The available UL slot may be a U (uplink)/S (special) slot available for transmission of an SRS. This allows an A-SRS to be flexibly triggered.

However, A-SRS triggering includes an operation not clear. For example, how t is configured/indicated is not clear. Unless such an operation is clear in A-SRS triggering, communication quality, throughput, and the like may be degraded.

In view of this, the inventors of the present invention came up with the idea of a method of A-SRS triggering.

Embodiments according to the present disclosure will be described in detail with reference to the drawings as follows. The radio communication methods according to respective embodiments may each be employed individually, or may be employed in combination.

In the present disclosure, "A/B" and "at least one of A and B" may be interchangeably interpreted. In the present disclosure, "A/B/C" may mean "at least one of A, B, and C".

In the present disclosure, activate, deactivate, indicate, select, configure, update, determine, and the like may be interchangeably interpreted. In the present disclosure, "support," "control," "controllable," "operate," "operable," and the like may be interchangeably interpreted.

In the present disclosure, radio resource control (RRC), an RRC parameter, an RRC message, a higher layer parameter, an information element (IE), a configuration, and the like may be interchangeably interpreted. In the present disclosure, a Medium Access Control control element (MAC Control Element (CE)), an update command, an activation/deactivation command, and the like may be interchangeably interpreted.

In the present disclosure, the higher layer signaling may be, for example, any one or combinations of Radio Resource Control (RRC) signaling, Medium Access Control (MAC) signaling, broadcast information, and the like.

In the present disclosure, the MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the present disclosure, the physical layer signaling may be, for example, downlink control information (DCI), uplink control information (UCI), or the like.

In the present disclosure, an index, an identifier (ID), an indicator, a resource ID, and the like may be interchangeably interpreted. In the present disclosure, a sequence, a list, a set, a group, a cluster, a subset, and the like may be interchangeably interpreted.

In the present disclosure, trigger, request, and schedule may be interchangeably interpreted.

In the present disclosure, DCI, a DCI format, at least one of DCI format 0_1, 0_2, 1_1, 1_2, and 2_3, DCI without data scheduling/CSI triggering, DCI without data scheduling nor CSI triggering, DCI for SRS triggering without data scheduling/CSI triggering, DCI with data scheduling/CSI triggering, DCI format 0_1/0_2 with data/CSI (scheduling/triggering), and DCI format 0_1/0_2 without data/CSI (scheduling/triggering) may be interchangeably interpreted.

In the present disclosure, an SRS resource set, SRS-ResourceSet, an SRS positioning resource set, and SRS-PosResourceSet may be interchangeably interpreted.

In the present disclosure, aperiodicSRS-ResourceTrigger, an entry in aperiodicSRS-ResourceTriggerList, an A-SRS resource trigger index, and a codepoint (value) of an SRS request field may be interchangeably interpreted.

In the present disclosure, a first offset, slotoffset, and a legacy triggering offset may be interchangeably interpreted.

In the present disclosure, a second offset, t, a new triggering offset, and an additional triggering offset may be interchangeably interpreted.

(Radio Communication Method)

First Embodiment

This embodiment relates to a method of configuring t.

One t value may be configured by an RRC IE. A plurality of t values may be configured by an RRC IE, and one of the plurality of t values may be indicated by a new field of DCI.

The DCI may be DCI format 0_1/0_2 with data/CSI (scheduling/triggering), or may be DCI format 0_1/0_2 without data/CSI (scheduling/triggering). The size of the new field may be configured (for example, zero to two bits) based on an RRC IE, or may be defined in a specification.

In the present disclosure, the new field may be referred to as a t indicator field.

The DCI may be both of DCI that schedules a PDSCH/PUSCH and DCI format 0_1/0_2 without data and without CSI.

When the DCI is transmitted in slot n and k is a legacy triggering offset, the reference slot may be slot n+k.

The DCI may include DCI format 1_1/1_2/1_3.

FIG. 5 shows an example of association between codepoints (values) of the t indicator field and t values. By an RRC IE, four t values t1 to t4 are respectively associated with four codepoints 00 to 11 of the 2-bit t indicator field. If the t indicator field is of one bit, t1 and t2 in the first two rows of this table may be respectively associated with two codepoints 0 and 1 of the t indicator field.

The values t1 to t4 may be configured for each SRS resource set. The t value that the value 01 of the t indicator field means may be different depending on the SRS resource set indicated in the SRS request field.

One or a plurality of t values may be configured for each SRS resource set.

When one t value is configured for one SRS resource set, the size of the t indicator field may be zero bits.

When two to four t values are configured for one SRS resource set, the size of the t indicator field may be one or two bits.

With respect to SRS resource sets configured with t values, each SRS resource set may be configured with K t values. K may be 1<=K<=4.

With respect to an SRS resource set configured with no t value, t=0 may be applied.

When no SRS resource set is configured with any t value, the UE may determine a slot offset in accordance with a Rel-15 operation.

When all the SRS resource sets are configured with t values, the UE may conform to an operation of the above-described A-SRS triggering enhancement function.

When none of the SRS resource sets is configured with any t value, the UE may conform to a Rel-15 operation.

When one SRS resource set is configured with a t value and another SRS resource sets are not configured with any t value, the UE may conform to an operation of the above-described A-SRS triggering enhancement for the one SRS resource set and may assume/apply t=0 for such another SRS resource sets.

The SRS request field is possible to be present in many DCI formats. A plurality of SRS resource sets can be configured. A problem is what t values configured for what SRS resource set the size of the new DCI field is determined based on.

FIG. 6 shows an example of association between values of a 2-bit SRS request field and A-SRS resource set(s) to be triggered. FIG. 7 shows an example of association between values of a 1-bit SRS request field and A-SRS resource set(s) to be triggered. Here, an SRS resource set corresponding to the value 01 of the SRS request field in a case that the DCI format is of 0_1/1_1 or 0_2/1_2 and the size of the SRS request field is two bits is the same as an SRS resource set corresponding to the value 1 of the SRS request field in a case that the DCI format is of 0_2/1_2 and the size of the SRS request field is one bit.

For configuration of t values in each SRS resource set, at least one of Restriction 1 to Restriction 3 as below may be applied.

<<Restriction 1>>

The t values may be configured such that new fields have the same size in (a plurality of) SRS resource set(s) (SRS resource set(s) configured with the same value of the higher layer parameter aperiodicSRS-ResourceTrigger (an entry in aperiodicSRS-ResourceTriggerList)) corresponding to the same codepoint (value) of an SRS request field.

For example, when the number of t values configured for a certain SRS resource set is one, the number of t values configured for another SRS resource set related (associated with the same codepoint value/associated with the same value of aperiodicSRS-ResourceTrigger) may also be one. In this case, the new field size may be zero bits.

For example, when the number of t values configured for a certain SRS resource set is two, the number of t values configured for another SRS resource set related (associated with the same codepoint value/associated with the same value of aperiodicSRS-ResourceTrigger) may also be two. In this case, the new field size may be one bit.

As an example in FIG. 8, when the number of t values in SRS resource set #1 associated with aperiodicSRS-ResourceTrigger=1 is two, the number of t values in SRS resource set #2 associated with aperiodicSRS-ResourceTrigger=1 is also two. In this case, the new field size may be one bit.

For example, when the number of t values configured for a certain SRS resource set is three or four, the number of t values configured for another SRS resource set related (associated with the same codepoint value/associated with the same value of aperiodicSRS-ResourceTrigger) may also be three or four. In this case, the new field size may be two bits. When the new field size is two bits, the number of t values configured for a certain SRS resource set may be the same as the number of t values configured for another SRS resource set related (associated with the same codepoint value/associated with the same value of aperiodicSRS-ResourceTrigger).

<<Restriction 2>>

The t values may be configured such that new fields have the same size in (a plurality of) SRS resource set(s) (all the SRS resource set(s) configured with any value of the higher layer parameter aperiodicSRS-ResourceTrigger (an entry in aperiodicSRS-ResourceTriggerList)) corresponding to all the codepoints (values) of the SRS request field.

For example, when the number of t values configured for a certain SRS resource set is one, the number of t values configured for another SRS resource set related (associated with the same codepoint value/associated with the same value of aperiodicSRS-ResourceTrigger) may also be one. In this case, the new field size may be zero bits.

For example, when the number of t values configured for a certain SRS resource set is two, the number of t values configured for another SRS resource set related (associated with the same codepoint value/associated with the same value of aperiodicSRS-ResourceTrigger) may also be two. In this case, the new field size may be one bit.

Figure 9:
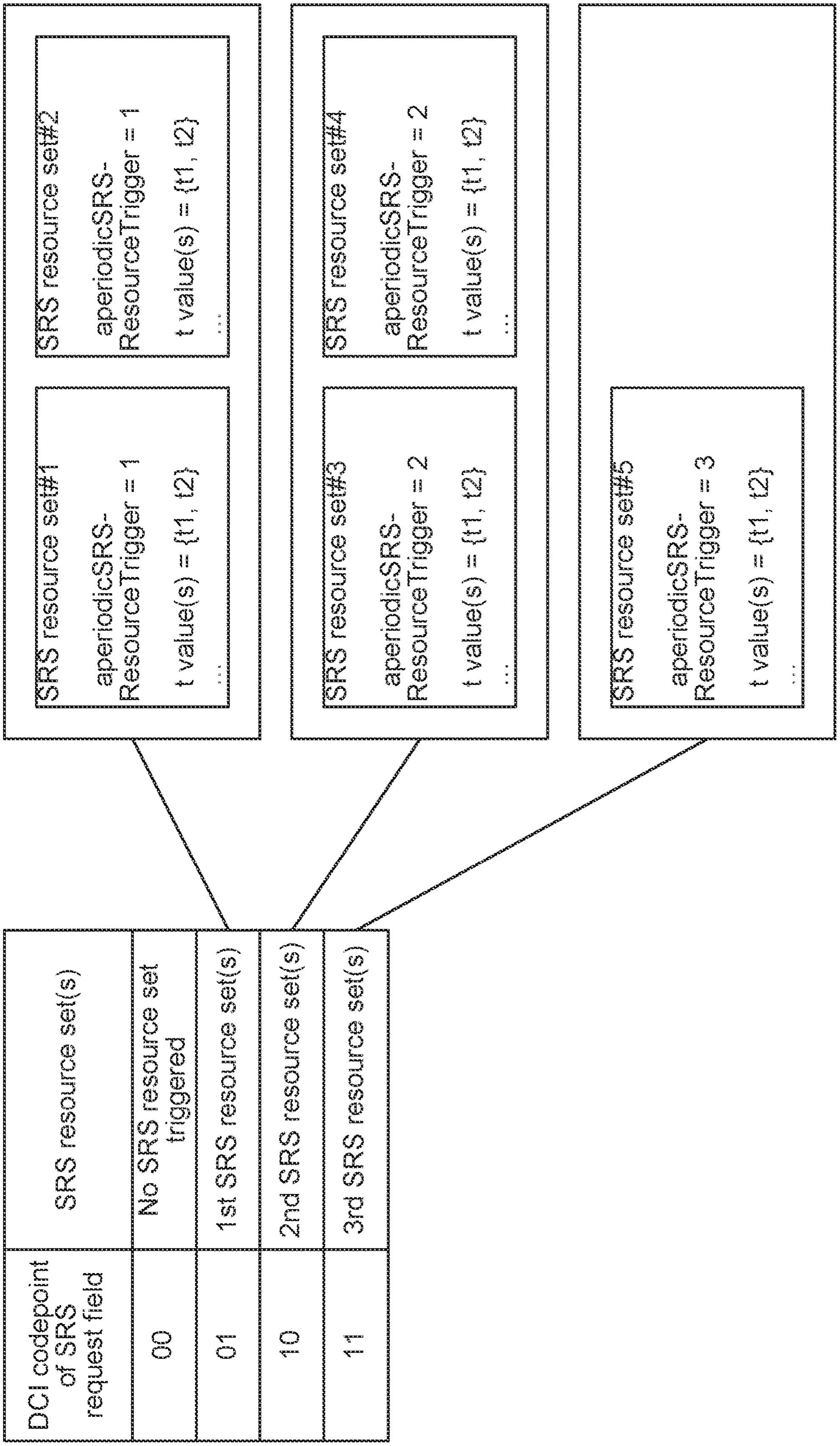
FIG. 9 shows an example of Restriction 2.

As an example in FIG. 9, in each of SRS resource set #1 associated with aperiodicSRS-ResourceTrigger=1, SRS resource set #2 associated with aperiodicSRS-ResourceTrigger=1, SRS resource set #3 associated with aperiodicSRS-ResourceTrigger=2, SRS resource set #4 associated with aperiodicSRS-ResourceTrigger=2, and SRS resource set #5 associated with aperiodicSRS-ResourceTrigger=3, the number of t values is two. In this case, the new field size may be one bit.

For example, when the number of t values configured for a certain SRS resource set is three or four, the number of t values configured for another SRS resource set related (associated with the same codepoint value/associated with the same value of aperiodicSRS-ResourceTrigger) may also be three or four. In this case, the new field size may be two bits. When the new field size is two bits, the number of t values configured for a certain SRS resource set may be the same as the number of t values configured for another SRS resource set related (associated with the same codepoint value/associated with the same value of aperiodicSRS-ResourceTrigger).

<<Restriction 3>>

The t values may be configured such that new fields have the same size in (a plurality of) SRS resource set(s) (all the SRS resource set(s) configured with any value of the higher layer parameter aperiodicSRS-ResourceTrigger (an entry in aperiodicSRS-ResourceTriggerList)) corresponding to all the codepoints (values) of SRS request fields corresponding to a plurality of different DCI formats (having different sizes).

For example, when the number of t values configured for a certain SRS resource set is one, the number of t values configured for another SRS resource set related (associated with the same codepoint value/associated with the same value of aperiodicSRS-ResourceTrigger) may also be one. In this case, the new field size may be zero bits.

For example, when the number of t values configured for a certain SRS resource set is two, the number of t values configured for another SRS resource set related (associated with the same codepoint value/associated with the same value of aperiodicSRS-ResourceTrigger) may also be two. In this case, the new field size may be one bit.

As an example in FIG. 10, for each of a plurality of SRS resource sets associated with all the codepoints 01, 10, and 11 of the 2-bit SRS request field in a certain DCI format and an SRS resource set associated with all the codepoint 1 of the 1-bit SRS request field in another DCI format, the number of t values is the same and the new field size is the same.

For example, when the number of t values configured for a certain SRS resource set is three or four, the number of t values configured for another SRS resource set related (associated with the same codepoint value/associated with the same value of aperiodicSRS-ResourceTrigger) may also be three or four. In this case, the new field size may be two bits. When the new field size is two bits, the number of t values configured for a certain SRS resource set may be the same as the number of t values configured for another SRS resource set related (associated with the same codepoint value/associated with the same value of aperiodicSRS-ResourceTrigger).

According to this embodiment, t is possible to be appropriately configured/indicated.

Second Embodiment

This embodiment relates to a case without restriction as in the first embodiment.

<<Case without Restriction 1 Described Above>>

A UE may determine a size of a new field, on the basis of an SRS resource set configured with the largest number of t values (the maximum number of t values configured for one SRS resource set) out of (a plurality of) SRS resource set(s) (all the SRS resource set(s) configured with the same value of the higher layer parameter aperiodicSRS-ResourceTrigger (an entry in aperiodicSRS-ResourceTriggerList)) corresponding to the same codepoint (value) of an SRS request field.

For example, when the number of t values configured for a certain SRS resource set is one and the number of t values configured for another SRS resource set related (associated with the same codepoint value/associated with the same value of aperiodicSRS-ResourceTrigger) is four, the new field size may be two bits, as a size that allows the maximum number four of the t values to be indicated.

Figure 11:
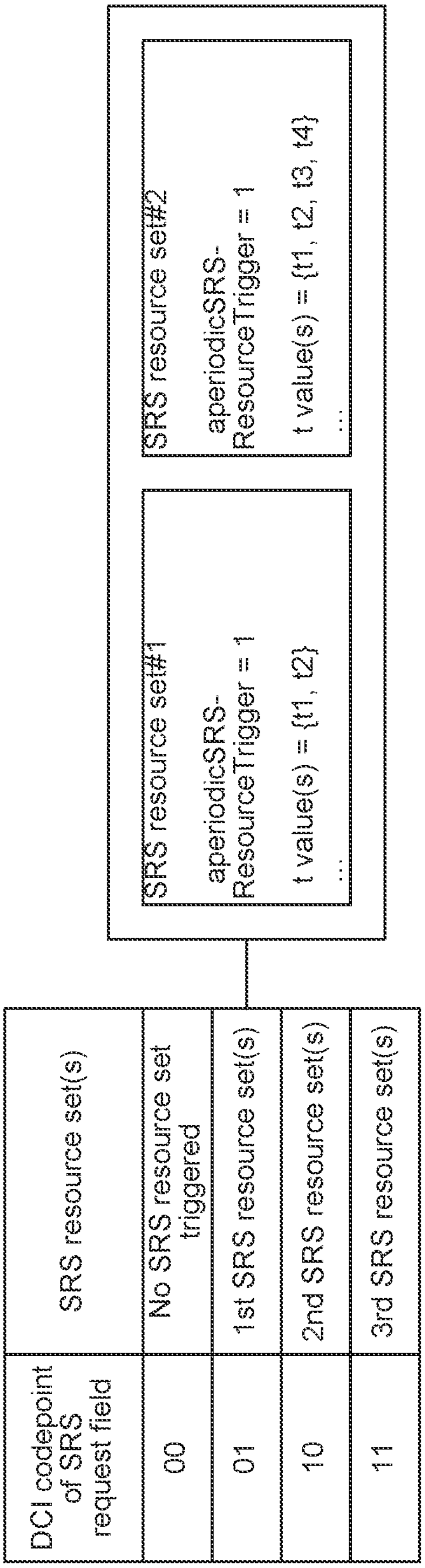
FIG. 11 shows an example of a second embodiment.

As an example in FIG. 11, the number of t values configured for SRS resource set #1 associated with aperiodicSRS-ResourceTrigger=1 is two, the number of t values configured for SRS resource set #2 associated with aperiodicSRS-ResourceTrigger=1 is four. In this case, the maximum number of t values configured for one SRS resource set is four, and thus the new field size may be two bits.

<<Case without Restriction 2 Described Above>>

A UE may determine a size of a new field, on the basis of an SRS resource set configured with the largest number of t values (the maximum number of t values configured for one SRS resource set) out of (a plurality of) SRS resource set(s) (all the SRS resource set(s) configured with any value of the higher layer parameter aperiodicSRS-ResourceTrigger (an entry in aperiodicSRS-ResourceTriggerList)) corresponding to all the codepoints (values) of an SRS request field.

For example, when the number of t values configured for a certain SRS resource set is one and the number of t values configured for another SRS resource set related (associated with the same codepoint value/associated with the same value of aperiodicSRS-ResourceTrigger) is four, the new field size may be two bits, as a size that allows the maximum number four of the t values to be indicated.

Figure 12:
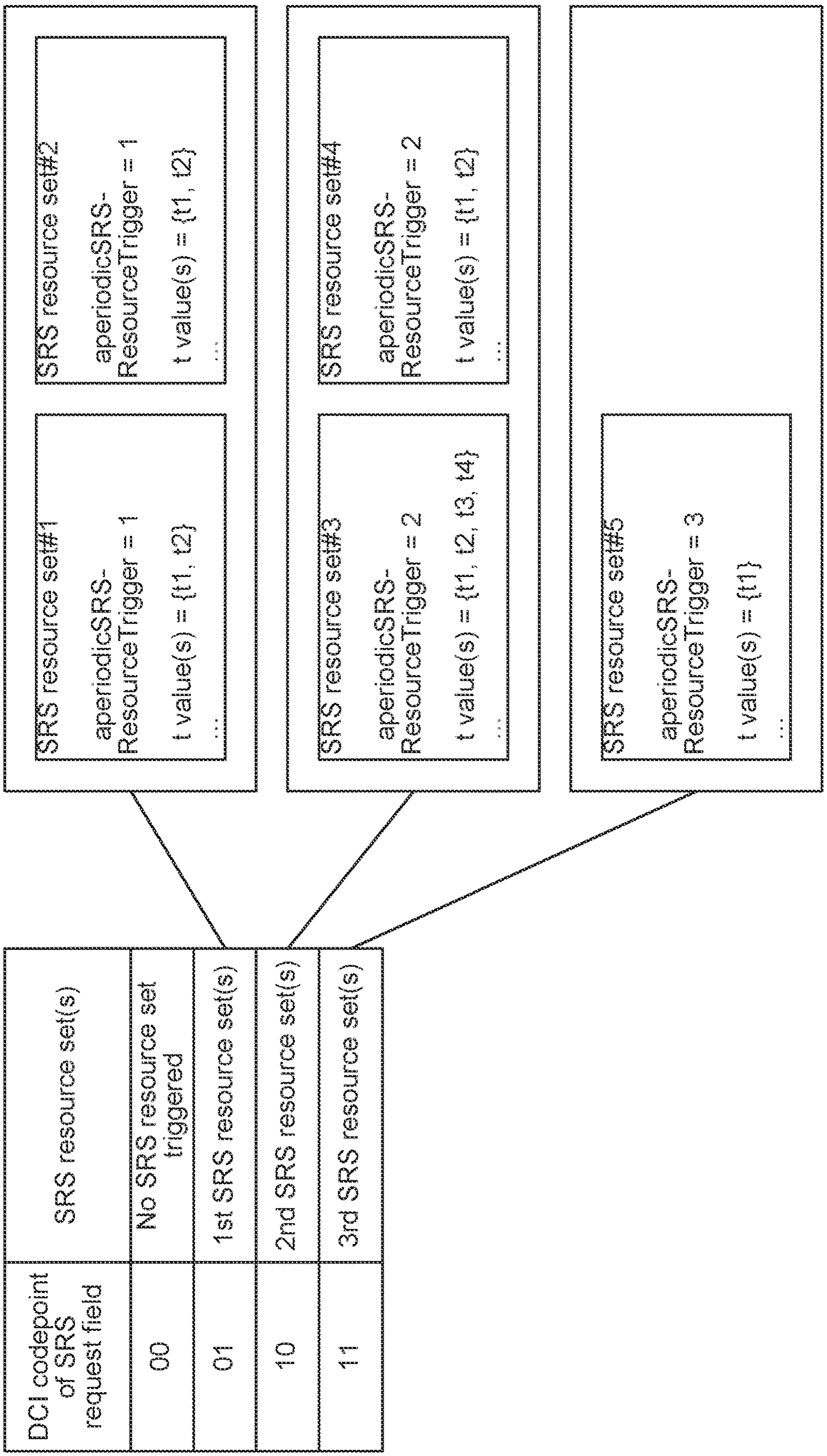
FIG. 12 shows another example of the second embodiment.

As an example in FIG. 12, the number of t values configured for SRS resource set #1 associated with aperiodicSRS-ResourceTrigger=1 is two, the number of t values configured for SRS resource set #2 associated with aperiodicSRS-ResourceTrigger=1 is two, the number of t values configured for SRS resource set #3 associated with aperiodicSRS-ResourceTrigger=2 is four, the number of t values configured for SRS resource set #4 associated with aperiodicSRS-ResourceTrigger=2 is two, and the number of t values configured for SRS resource set #5 associated with aperiodicSRS-ResourceTrigger=3 is one. In this case, the maximum number of t values configured for one SRS resource set is four, and thus the new field size may be two bits.

<<Case without Restriction 3 Described Above>>

A UE may determine a size of a new field, on the basis of an SRS resource set configured with the largest number of t values (the maximum number of t values configured for one SRS resource set) out of (a plurality of) SRS resource set(s) (all the SRS resource set(s) configured with any value of the higher layer parameter aperiodicSRS-ResourceTrigger (an entry in aperiodicSRS-ResourceTriggerList)) corresponding to all the codepoints (values) of SRS request fields corresponding to a plurality of different DCI formats (having different sizes).

According to this embodiment, even in a case without restriction as in the first embodiment, t is possible to be appropriately configured/indicated.

Third Embodiment

This embodiment relates to a case where a t value is different between a plurality of SRS resource sets.

In a case where the number of t values configured for a first SRS resource set (SRS resource set with aperiodicSRS-ResourceTrigger (an entry in aperiodicSRS-ResourceTriggerList) set to 1) is different from the number of t values configured for another SRS resource sets (SRS resource sets with aperiodicSRS-ResourceTrigger set to another value), a UE may conform to at least one of Assumption 1 to Assumption 3 as below.

For this case, a case where the number of t values is different between a plurality of SRS resource sets each associated with a respective one of a plurality of codepoints of an SRS request field, a case where the number of t values is different between an SRS resource set corresponding to DCI format 1_1/0_1 and an SRS resource set corresponding to DCI format 1_2/0_2, and a case where the number of t values is different between a plurality of SRS resource sets each corresponding to a respective one of a plurality of DCI formats may be interchangeably interpreted.

In an example of FIG. 13A, the number of t values configured for each of the first and second SRS resource sets associated with the codepoints 01 and 10 of the 2-bit SRS request field in DCI format 1_1/0_1 is two and the number of t values configured for the third SRS resource set associated with the codepoint 11 of the SRS request field is four. In this case, the size of the new field may be two bits.

In an example of FIG. 13B, the number of t values configured for the first SRS resource set associated with the codepoint 1 of the 1-bit SRS request field in DCI format 1_2/0_2 is two. In this case, the size of the new field may be one bit.

The size of the new field required for the configuration of FIG. 13A is different from the size of the new field required for the configuration of FIG. 13B.

<<Assumption 1>>

The size of the new field is the same between different DCI formats. In this case, as compared with Assumption 2 described below, the specification/UE process can be simplified.

A plurality of t values may be associated with a plurality of codepoints of a new field in DCI format 1_1/0_1. A new field in DCI format 1_2/0_2 may indicate a t value by using a specific codepoint. For example, the specific codepoint may be the first (lower) N/2 codepoints out of N codepoints used for the new field in DCI format 1_1/0_1.

Figure 14:
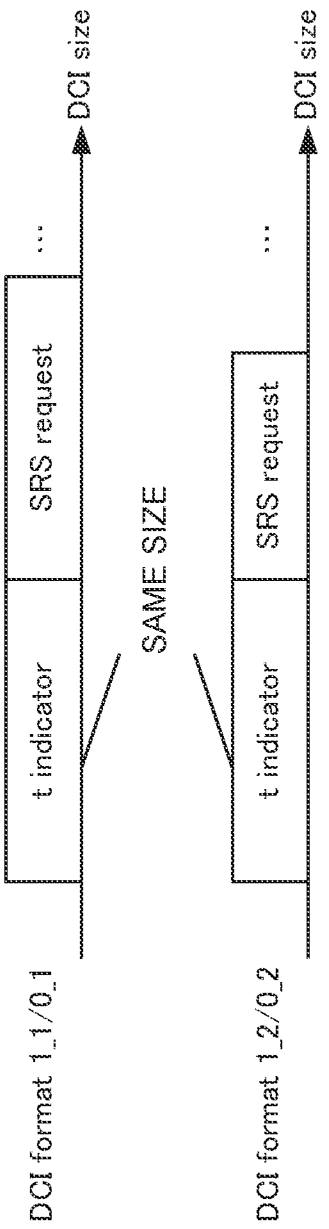
FIG. 14 shows an example of a size of a new field according to Assumption 1.

In an example of FIG. 14, the size of the new field in DCI format 1_1/0_1 is the same as the size of the new field in DCI format 1_2/0_2.

In an example of FIG. 15, four t values may each be associated with a respective one of four codepoints of a 2-bit new field in DCI format 1_1/0_1. A 2-bits new field in DCI format 1_2/0_2 may only use the first two codepoints out of the four codepoints.

<<Assumption 2>>

The size of the new field may be different between different DCI formats. In this case, as compared with Assumption 1 described above, the size of the new field is possible to be reduced (possible to be made necessary and sufficient).

Association of a plurality of t values with a plurality of codepoints of a new field in DCI format 1_1/0_1 and association of a plurality of t values with a plurality of codepoints of a new field in DCI format 1_2/0_2 may be separately configured/defined.

Figure 16:
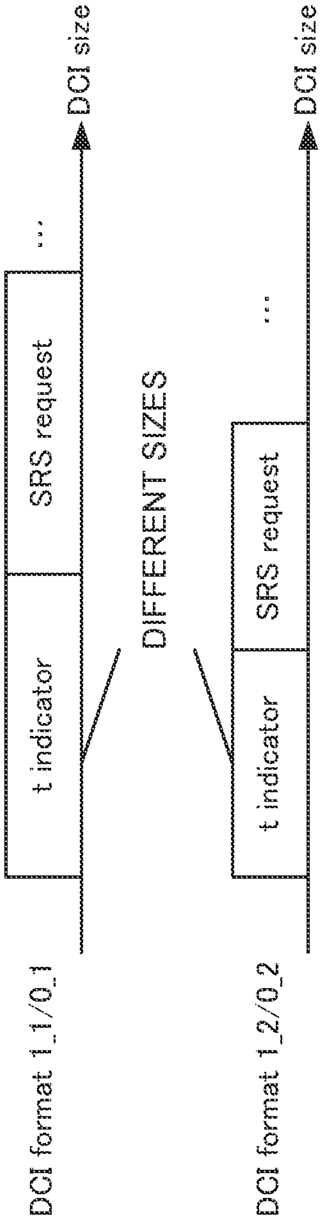
FIG. 16 shows an example of the size of the new field according to Assumption 1.

In an example of FIG. 16, the size of the new field in DCI format 1_1/0_1 is different from the size of the new field in DCI format 1_2/0_2.

In an example of FIG. 17, association of four t values each with a respective one of four codepoints of a 2-bit new field in DCI format 1_1/0_1 may be configured/defined. Association of two t values each with a respective one of two codepoints of a 1-bit new field in DCI format 1_2/0_2 may be configured/defined.

Association of a plurality of t values with a plurality of codepoints of a new field in DCI format 1_1/0_1 may be configured/defined whereas association of a plurality of t values with a plurality of codepoints of a new field in DCI format 1_2/0_2 need not be separately configured/defined. In this case, as described in Assumption 1, the new field in DCI format 1_2/0_2 may indicate a t value by using a specific codepoint.

<<Assumption 3>>

It may be defined that a UE does not assume at least one of a case where the number of t values is different between a plurality of SRS resource sets each associated with a respective one of a plurality of codepoints of an SRS request field and a case where the number of t values is different between a plurality of SRS resource sets each associated with a respective one of a plurality of DCI formats.

According to this embodiment, a t value is possible to be appropriately indicated using a new field.

Other Embodiments

<<UE Capability Information/Higher Layer Parameter>>

A higher layer parameter (RRC IE)/UE capability corresponding to a function (characteristic, feature) in each embodiment as described above may be defined. The higher layer parameter may indicate whether to enable the function. The UE capability may indicate whether a UE supports the function.

A UE configured with the higher layer parameter corresponding to the function may perform the function. "The UE not configured with the higher layer parameter corresponding to the function does not perform the function (for example, in conformity to Rel. 15/16)" may be defined.

The UE that has reported/transmitted the UE capability indicating support of the function may perform the function. "The UE that has not reported the UE capability indicating support of the function does not perform the function (for example, in conformity to Rel. 15/16)" may be defined.

When the UE reports/transmits the UE capability indicating support of the function and is configured with the higher layer parameter corresponding to the function, the UE may perform the function. "When the UE does not report/transmit the UE capability indicating support of the function or is not configured with the higher layer parameter corresponding to the function, the UE does not perform the function (for example, in conformity to Rel. 15/16)" may be defined.

Which embodiment/option/choice/function in the plurality of embodiments as described above is to be used may be configured by a higher layer parameter, may be reported by the UE as the UE capability, may be defined in a specification, or may be determined by the UE capability reported and configuration of the higher layer parameter.

The UE capability may indicate whether to support at least one of the following functions.

- A-SRS triggering enhancement function.
- Configuration of a new field (t indicator field).
- Dynamically changing t by DCI.
- Configuring a plurality of t values for one SRS resource set.
- Configuring a different number of t values for a plurality of different SRS resource sets.

The UE capability/higher layer parameter as described above allows the UE to implement the function as described above while maintaining compatibility with an existing specification.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 18:
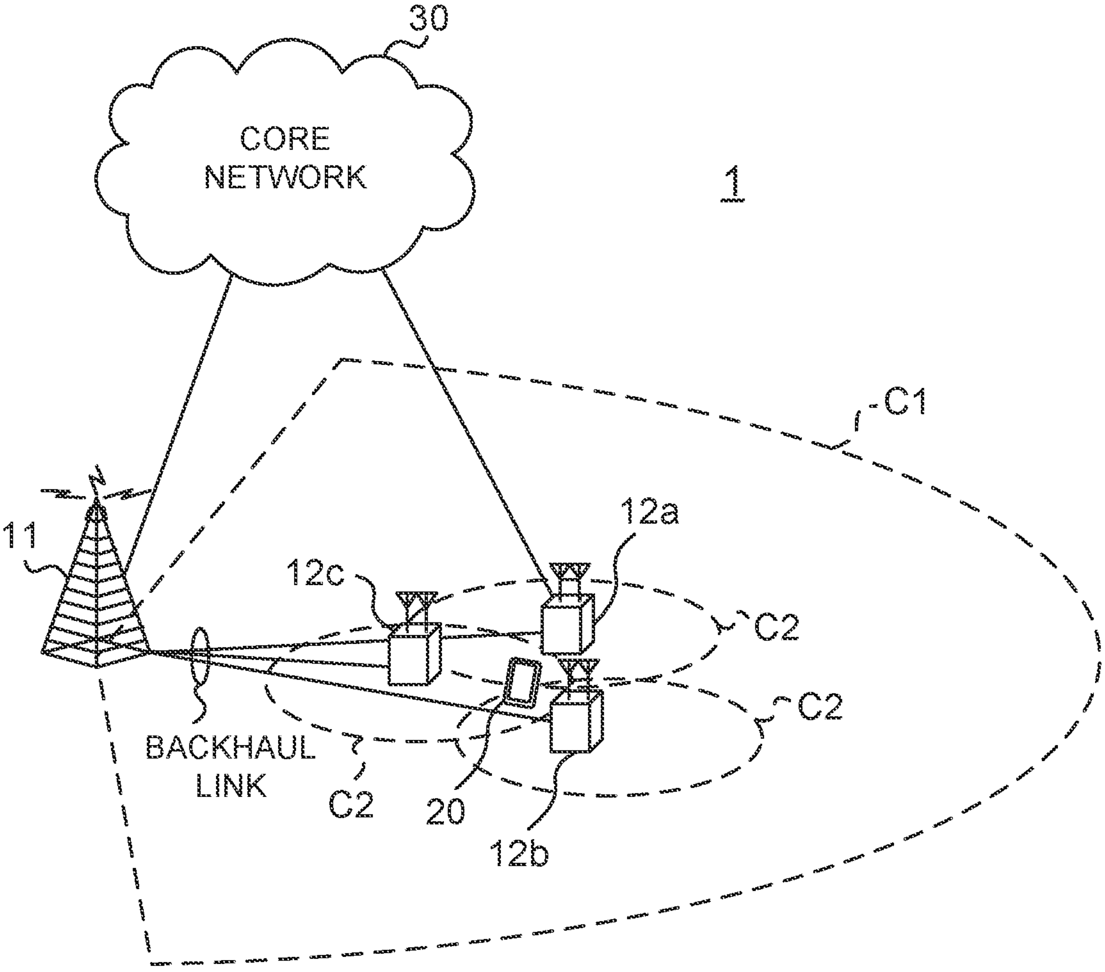
FIG. 18 is a diagram to show an example of a schematic structure of a radio communication system according to one embodiment.

FIG. 18 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a reference signal for measurement (sounding reference signal (SRS)), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 19:
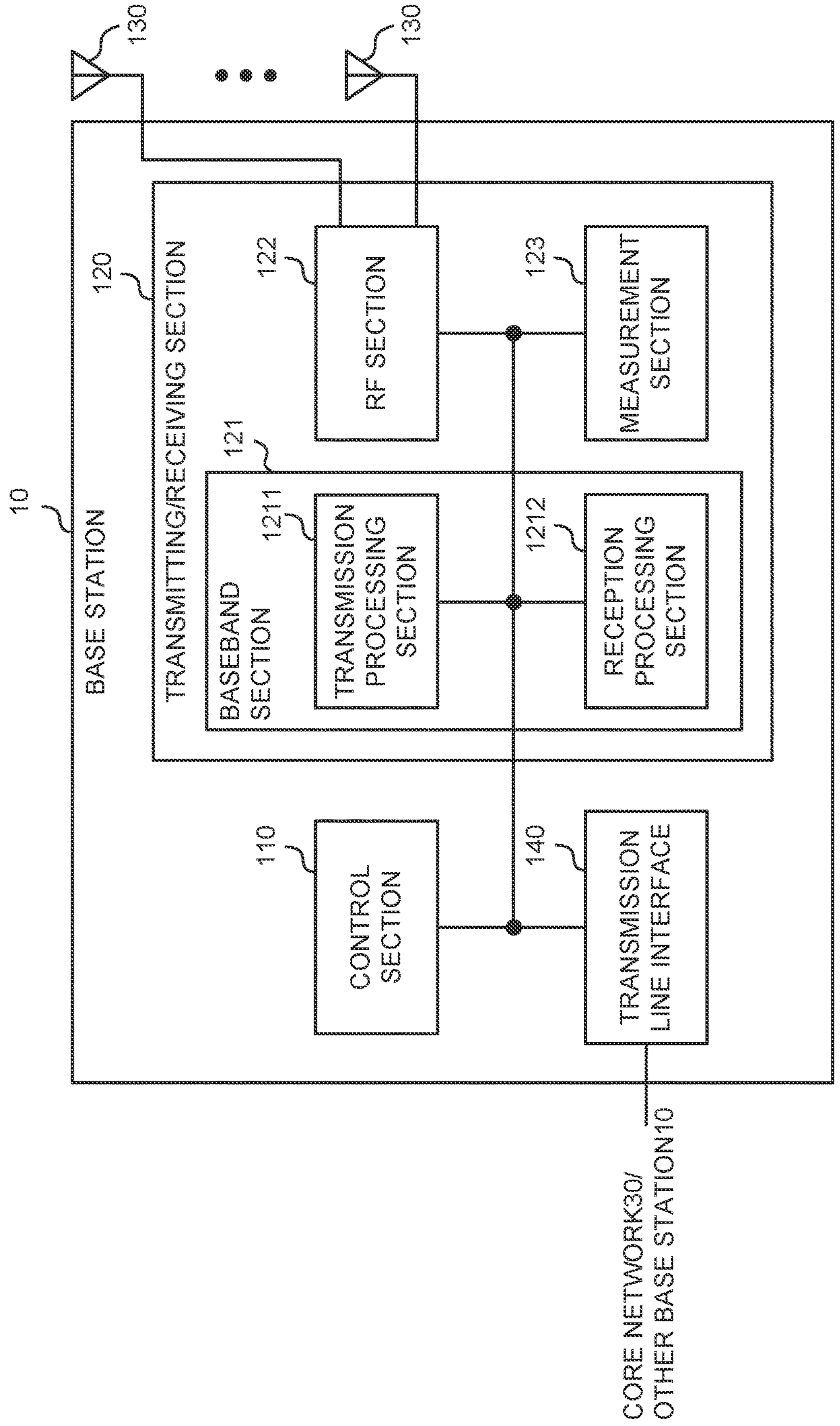
FIG. 19 is a diagram to show an example of a structure of a base station according to one embodiment.

FIG. 19 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit configuration for a plurality of sounding reference signal (SRS) resource sets and transmit downlink control information indicating triggering of an SRS. The control section 110 may control reception of the SRS by using one or more SRS resource sets indicated in the downlink control information out of the plurality of SRS resource sets. A timing for the reception of the SRS may be based on a timing for transmission of the downlink control information and on a first offset and a second offset included in the one or more SRS resource sets.

(User Terminal)

Figure 20:
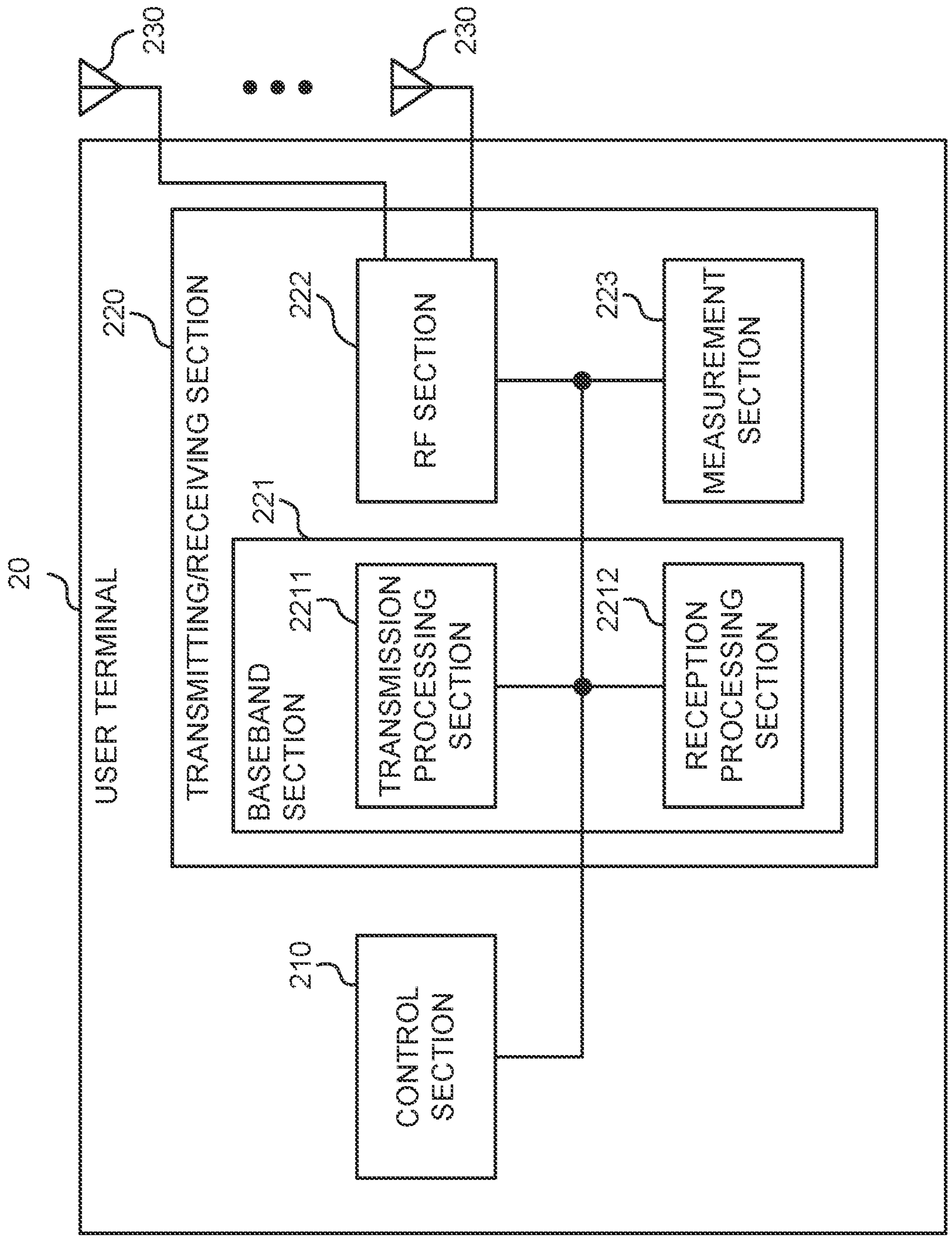
FIG. 20 is a diagram to show an example of a structure of a user terminal according to one embodiment.

FIG. 20 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211 and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive configuration (for example, SRS-ResourceSet) for a plurality of sounding reference signal (SRS) resource sets and receive downlink control information indicating triggering of an SRS. The control section 210 may control transmission of the SRS by using one or more SRS resource sets indicated in the downlink control information out of the plurality of SRS resource sets. A timing for the transmission of the SRS may be based on a timing for reception of the downlink control information and on a first offset (for example, slotoffset) and a second offset (for example, t) included in the one or more SRS resource sets.

Each of the plurality of SRS resource sets may include a plurality of values of the second offset, and the downlink control information may include a field (for example, new field, t indicator field) indicating one of the plurality of values.

The control section may determine a size of the field on the basis of the configuration.

The number of the plurality of values may be the same between the one or more SRS resource sets.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 21:
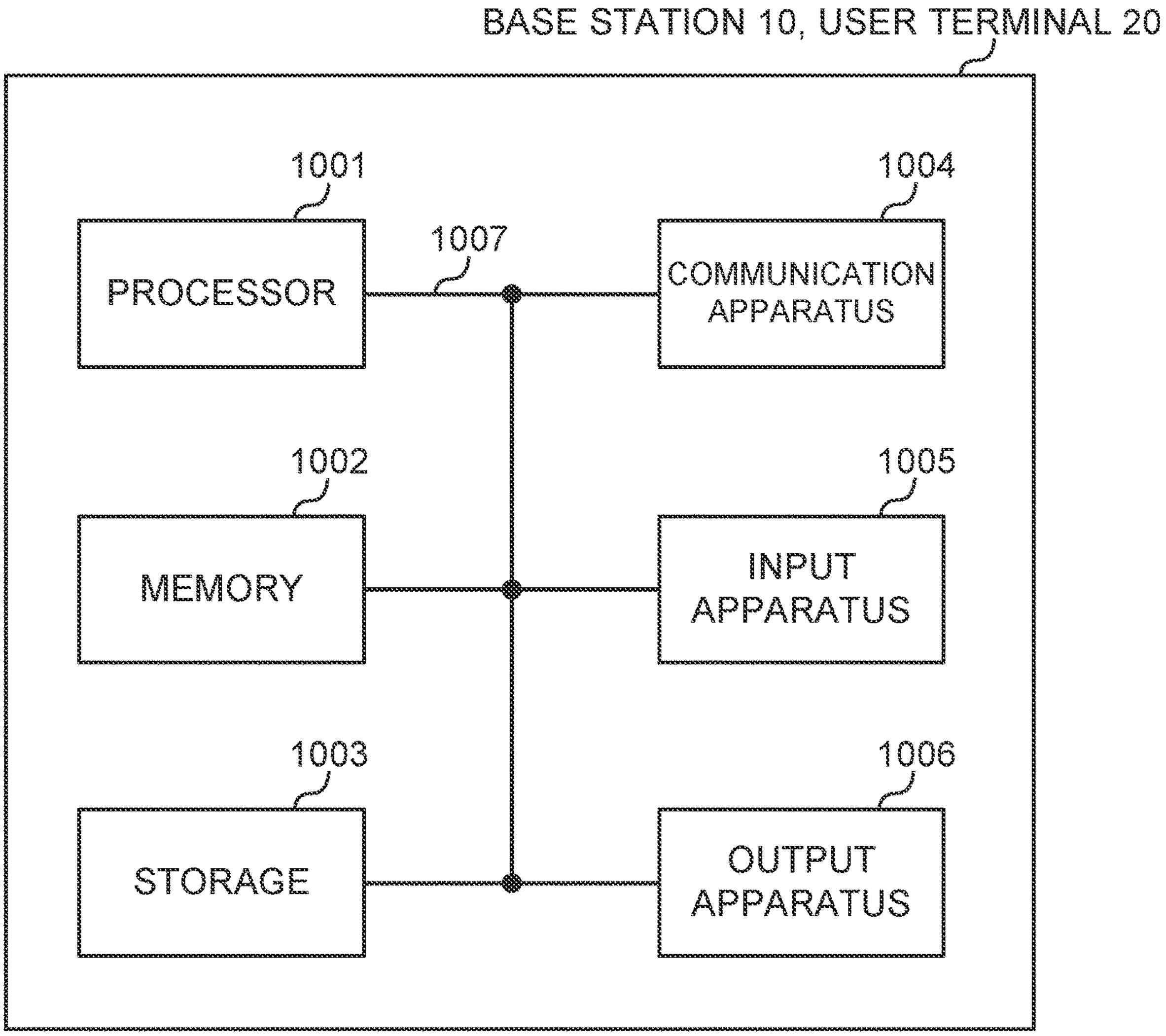
FIG. 21 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 21 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAN), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

VARIATIONS

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Notification of information is by no means limited to the aspects/embodiments described in the present disclosure, and other methods may be used as well. For example, notification of information in the present disclosure may be implemented by using physical layer signaling (for example, downlink control information (DCI), uplink control information (UCI)), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be notified using, for example, MAC control elements (MAC CEs).

Also, notification of certain information (for example, reporting of "being X") does not necessarily have to be notified explicitly, and can be notified implicitly (by, for example, not notifying this certain information or notifying another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be a device mounted on a moving object or a moving object itself, and so on.

The moving object is a movable object with any moving speed, and naturally a case where the moving object is stopped is also included. Examples of the moving object include a vehicle, a transport vehicle, an automobile, a motorcycle, a bicycle, a connected car, a loading shovel, a bulldozer, a wheel loader, a dump truck, a fork lift, a train, a bus, a trolley, a rickshaw, a ship and other watercraft, an airplane, a rocket, a satellite, a drone, a multicopter, a quadcopter, a balloon, and an object mounted on any of these, but these are not restrictive. The moving object may be a moving object that autonomously travels based on a direction for moving.

The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor.

Figure 22:
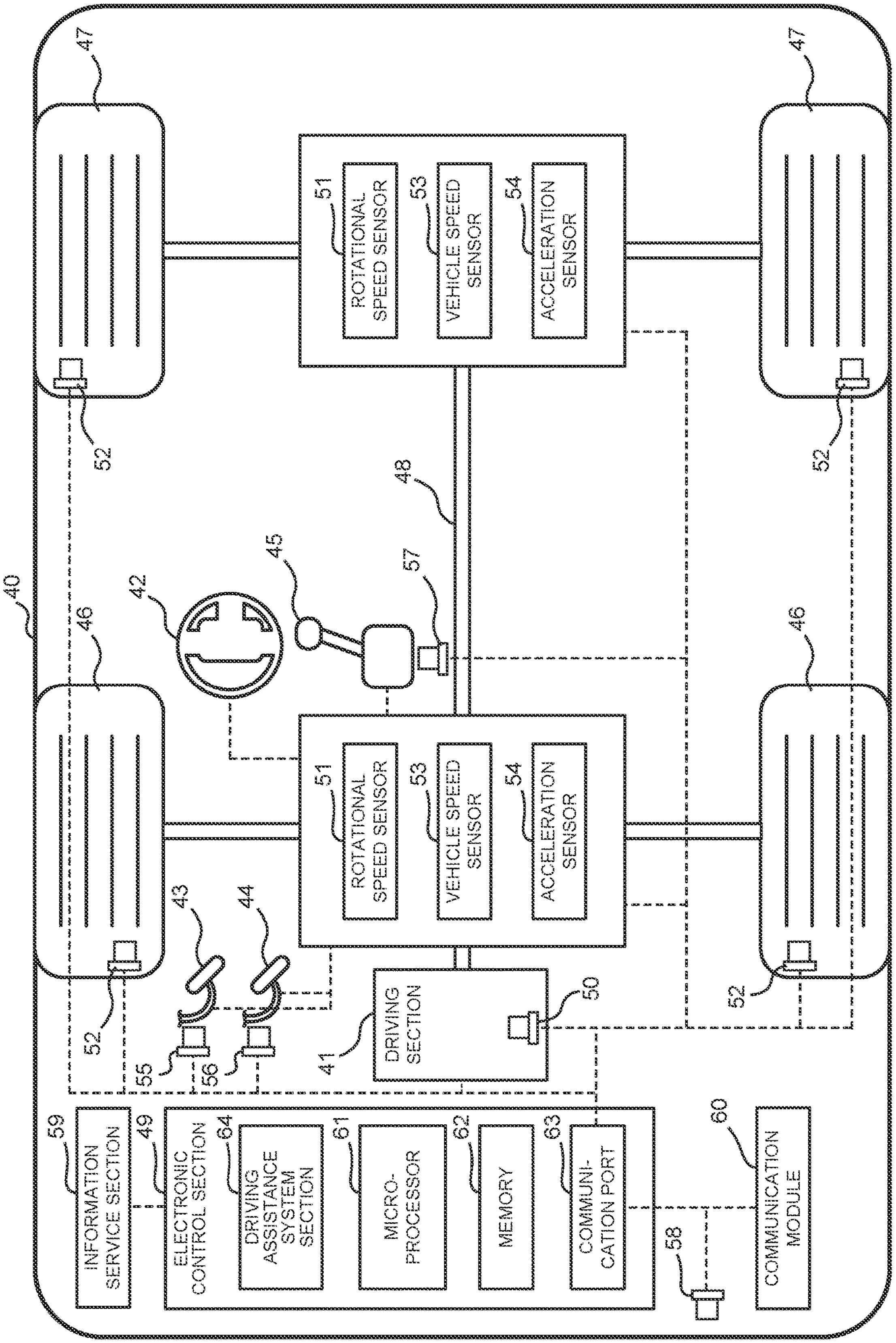
FIG. 22 is a diagram to show an example of a vehicle according to one embodiment.

FIG. 22 is a diagram to show an example of a vehicle according to one embodiment. A vehicle 40 includes a driving section 41, a steering section 42, an accelerator pedal 43, a brake pedal 44, a shift lever 45, right and left front wheels 46, right and left rear wheels 47, an axle 48, an electronic control section 49, various sensors (including a current sensor 50, a rotational speed sensor 51, a pneumatic sensor 52, a vehicle speed sensor 53, an acceleration sensor 54, an accelerator pedal sensor 55, a brake pedal sensor 56, a shift lever sensor 57, and an object detection sensor 58), an information service section 59, and a communication module 60.

The driving section 41 includes, for example, at least one of an engine, a motor, and a hybrid of an engine and a motor. The steering section 42 at least includes a steering wheel, and is configured to steer at least one of the front wheels 46 and the rear wheels 47, based on operation of the steering wheel operated by a user.

The electronic control section 49 includes a microprocessor 61, a memory (ROM, RAM) 62, and a communication port (for example, an input/output (IO) port) 63. The electronic control section 49 receives, as input, signals from the various sensors 50 to 58 included in the vehicle. The electronic control section 49 may be referred to as an Electronic Control Unit (ECU).

Examples of the signals from the various sensors 50 to 58 include a current signal from the current sensor 50 for sensing current of a motor, a rotational speed signal of the front wheels 46/rear wheels 47 acquired by the rotational speed sensor 51, a pneumatic signal of the front wheels 46/rear wheels 47 acquired by the pneumatic sensor 52, a vehicle speed signal acquired by the vehicle speed sensor 53, an acceleration signal acquired by the acceleration sensor 54, a depressing amount signal of the accelerator pedal 43 acquired by the accelerator pedal sensor 55, a depressing amount signal of the brake pedal 44 acquired by the brake pedal sensor 56, an operation signal of the shift lever 45 acquired by the shift lever sensor 57, and a detection signal for detecting an obstruction, a vehicle, a pedestrian, and the like acquired by the object detection sensor 58.

The information service section 59 includes various devices for providing (outputting) various pieces of information such as drive information, traffic information, and entertainment information, such as a car navigation system, an audio system, a speaker, a display, a television, and a radio, and one or more ECUs that control these devices. The information service section 59 provides various pieces of information/services (for example, multimedia information/multimedia service) for an occupant of the vehicle 40, using information acquired from an external apparatus via the communication module 60 and the like.

The information service section 59 may include an input device (for example, a keyboard, a mouse, a microphone, a switch, a button, a sensor, touch panel, and the like) for receiving input from the outside, or may include an output device (for example, a display, a speaker, an LED lamp, a touch panel, and the like) for implementing output to the outside.

A driving assistance system section 64 includes various devices for providing functions for preventing an accident and reducing a driver's driving load, such as a millimeter wave radar, Light Detection and Ranging (LiDAR), a camera, a positioning locator (for example, a Global Navigation Satellite System (GNSS) and the like), map information (for example, a high definition (HD) map, an autonomous vehicle (AV)) map, and the like), a gyro system (for example, an inertial measurement apparatus (inertial measurement unit (IMU)), an inertial navigation apparatus (inertial navigation system (INS)), and the like), an artificial intelligence (AI) chip, and an AI processor, and one or more ECUs that control these devices. The driving assistance system section 64 transmits and receives various pieces of information via the communication module 60, and implements a driving assistance function or an autonomous driving function.

The communication module 60 can communicate with the microprocessor 61 and the constituent elements of the vehicle 40 via the communication port 63. For example, via the communication port 63, the communication module 60 transmits and receives data (information) to and from the driving section 41, the steering section 42, the accelerator pedal 43, the brake pedal 44, the shift lever 45, the right and left front wheels 46, the right and left rear wheels 47, the axle 48, the microprocessor 61 and the memory (ROM, RAM) 62 in the electronic control section 49, and the various sensors 50 to 58, which are included in the vehicle 40.

The communication module 60 can be controlled by the microprocessor 61 of the electronic control section 49, and is a communication device that can perform communication with an external apparatus. For example, the communication module 60 performs transmission and reception of various pieces of information to and from the external apparatus via radio communication. The communication module 60 may be either inside or outside the electronic control section 49. The external apparatus may be, for example, the base station 10, the user terminal 20, or the like described above. The communication module 60 may be, for example, at least one of the base station 10 and the user terminal 20 described above (may function as at least one of the base station 10 and the user terminal 20).

The communication module 60 may transmit at least one of signals from the various sensors 50 to 58 described above input to the electronic control section 49, information obtained based on the signals, and information based on an input from the outside (a user) obtained via the information service section 59, to the external apparatus via radio communication. The electronic control section 49, the various sensors 50 to 58, the information service section 59, and the like may be referred to as input sections that receive input. For example, the PUSCH transmitted by the communication module 60 may include information based on the input.

The communication module 60 receives various pieces of information (traffic information, signal information, inter-vehicle distance information, and the like) transmitted from the external apparatus, and displays the various pieces of information on the information service section 59 included in the vehicle. The information service section 59 may be referred to as an output section that outputs information (for example, outputs information to devices, such as a display and a speaker, based on the PDSCH received by the communication module 60 (or data/information decoded from the PDSCH)).

The communication module 60 stores the various pieces of information received from the external apparatus in the memory 62 that can be used by the microprocessor 61. Based on the pieces of information stored in the memory 62, the microprocessor 61 may perform control of the driving section 41, the steering section 42, the accelerator pedal 43, the brake pedal 44, the shift lever 45, the right and left front wheels 46, the right and left rear wheels 47, the axle 48, the various sensors 50 to 58, and the like included in the vehicle 40.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "sidelink"). For example, an uplink channel, a downlink channel and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (M4B), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced, modified, created, or defined based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The present application is based on Japanese Patent Application No. 2021-168400 filed on Oct. 13, 2021, the entire contents of which are incorporated herein by reference.

The invention claimed is:

1. A terminal comprising:

a receiver that receives radio resource control (RRC) signaling configuring a plurality of sounding reference signal (SRS) resource sets, and receives downlink control information (DCI) including a field that indicates one offset value among one or more offset values configured for each of the plurality of SRS resource sets; and a processor that controls transmission of an SRS based on the field, wherein a bit size of the field is determined based on a number of offset values configured for an SRS resource set for which a greatest number of offset values is configured, among the plurality of SRS resource sets, and wherein the bit size of the field is same between a DCI format scheduling a physical uplink shared channel (PUSCH) and a DCI format scheduling a physical downlink shared channel (PDSCH).

2. The terminal according to claim 1, wherein the DCI format scheduling the PUSCH is DCI format 0_1 and DCI format 0_2, and wherein the DCI format scheduling the PDSCH is DCI format 1_1 and DCI format 1_2.

3. A radio communication method for a terminal, comprising:

receiving radio resource control (RRC) signaling configuring a plurality of sounding reference signal (SRS) resource sets, and receives downlink control information (DCI) including a field that indicates one offset value among one or more offset values configured for each of the plurality of SRS resource sets; and controlling transmission of an SRS based on the field, wherein a bit size of the field is determined based on a number of offset values configured for an SRS resource set for which a greatest number of offset values is configured, among the plurality of SRS resource sets, and wherein the bit size of the field is same between a DCI format scheduling a physical uplink shared channel (PUSCH) and a DCI format scheduling a physical downlink shared channel (PDSCH).

4. A base station comprising:

a transmitter that transmits radio resource control (RRC) signaling configuring a plurality of sounding reference signal (SRS) resource sets, and transmits downlink control information (DCI) including a field that indicates one offset value among one or more offset values configured for each of the plurality of SRS resource sets;

a receiver that receives an SRS that is transmitted from the terminal based on the field; and a processor that determines a bit size of the field based on a number of offset values configured for an SRS resource set for which a greatest number of offset values is configured, among the plurality of SRS resource sets, wherein the bit size of the field is same between a DCI format scheduling a physical uplink shared channel (PUSCH) and a DCI format scheduling a physical downlink shared channel (PDSCH).

5. A system comprising a terminal and a base station, wherein the terminal comprises:

a receiver that receives radio resource control (RRC) signaling configuring a plurality of sounding reference signal (SRS) resource sets, and receives downlink control information (DCI) including a field that indicates one offset value out of one or more offset values configured for each of the plurality of SRS resource sets; and a processor that controls transmission of an SRS based on the field, and the base station comprises:
a receiver that receives the SRS,
wherein a bit size of the field is determined based on a number of offset values configured for an SRS resource set for which a greatest number of offset values is configured, among the plurality of SRS resource sets, and
wherein the bit size of the field is same between a DCI format scheduling a physical uplink shared channel (PUSCH) and a DCI format scheduling a physical downlink shared channel (PDSCH).

* * * * *